US012706930B1

(12) United States Patent
Naftali et al.

(10) Patent No.: US 12,706,930 B1
(45) Date of Patent: Aug. 11, 2026

(54) METHOD AND SYSTEM FOR CLOUD CYBERSECURITY MONITORING

(71) Applicant: Wiz, Inc., New York, NY (US)

(72) Inventors: Eden Koby Naftali, Tel Aviv (IL); Gilad Lekner, Tel Aviv (IL); Eyal Wiener, Tel Aviv (IL); Oron Noah, Geulim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/258,504

(22) Filed: Jul. 2, 2025

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 10,148,677 B2 12/2018 Muddu et al.
11,121,872 B2 * 9/2021 Digiambattista ....... G06F 21/00
11,949,692 B1 4/2024 Glyer et al.

FOREIGN PATENT DOCUMENTS

CA 3229304 A1 * 2/2023 ......... G06F 3/04817

* cited by examiner

*Primary Examiner* — Tri M Tran
(74) *Attorney, Agent, or Firm* — M&B IP Analysts, LLC

(57) ABSTRACT

A method and system for deploying a cybersecurity monitoring system in a cloud computing environment is presented. The method includes: deploying a plurality of cybersecurity modules in a cloud computing environment, each cybersecurity module configured to monitor a portion of the cloud computing environment; periodically determining for each cybersecurity module a phase of deployment in the cloud computing environment; generating a corrective action for a first cybersecurity module of the plurality of cybersecurity modules, in response to determining that a phase of deployment for the first cybersecurity module indicates that the first cybersecurity module is partially deployed; and initiating the corrective action in the cloud computing environment.

17 Claims, 5 Drawing Sheets

310
Deploy the plurality of cybersecurity modules in multiple cloud computing environments 312
Associate a user account with a cyber security level achievement based on the report 314
Assign a tag to the user account, wherein the tag is configured to indicate the corrective actions and the cyber security level achievement

METHOD AND SYSTEM FOR CLOUD CYBERSECURITY MONITORING

TECHNICAL FIELD

The present disclosure relates generally to the cloud deployment of cybersecurity entities and specifically to generating a corrective action for cybersecurity modules based on deployment of the cybersecurity modules in cloud computing environments.

BACKGROUND

Cloud computing environments are expensive to maintain due to several factors. The infrastructure requires significant capital investment for servers, data centers, and networking equipment. Operational costs add up through energy consumption, cooling systems, maintenance, and security measures to protect data and services. Additionally, cloud providers often charge for data transfer, storage, and specific service usage, leading to substantial ongoing expenses.

Overprovisioning resources such as cybersecurity modules is problematic because it involves allocating more computing power, storage, or bandwidth than necessary to ensure reliability and performance. However, underdeployment of the cybersecurity modules may create a cybersecurity protection gap. Existing cybersecurity solution do not sufficiently monitor the deployment of the cybersecurity modules and do not correct their cloud deployment in real-time.

Accordingly, it would be advantageous to provide a solution for monitoring cloud deployment of cybersecurity entities and generating a corrective action based on deployment of the cybersecurity modules in the cloud computing environments that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Other embodiments of this aspect include corresponding computer systems, apparatus, and computer programs recorded on one or more computer storage devices, each configured to perform the actions of the methods.

Implementations may include one or more of the following features. Method may include: deploying a plurality of cybersecurity modules in a cloud computing environment, each cybersecurity module configured to monitor a portion of the cloud computing environment. Method may include: periodically determining for each cybersecurity module a phase of deployment in the cloud computing environment. Method may include: generate a corrective action for a first cybersecurity module of the plurality of cybersecurity modules, in response to determining that a phase of deployment for the first cybersecurity module indicates that the first cybersecurity module is partially deployed. Method may include; and initiating the corrective action in the cloud computing environment. Method may include: deploying the plurality of cybersecurity modules in multiple cloud computing environments. The multiple cloud computing environments maybe each deployed on a different cloud computing infrastructure comprising any of: VPC, AWS VPC and GPT infrastructures. Method may include: generating the corrective action that comprises generating instructions to the deployed cybersecurity module of the plurality of cybersecurity modules to give access install or deploy additional monitors comprising any of: VMs, containers and IAM servers Method may include: associating a user account with a cybersecurity level achievement based on the report. Method may include: assigning a tag to the user account, wherein the tag is configured to indicate the corrective actions and the cybersecurity level achievement.

Implementations of the described method may include hardware, a method or process, or a computer-tangible medium.

In one general aspect, non-transitory computer-readable medium may include one or more instructions that, when executed by one or more processors of a device, cause the device to: deploy a plurality of cybersecurity modules in a cloud computing environment, each cybersecurity module configured to monitor a portion of the cloud computing environment; periodically determine for each cybersecurity module a phase of deployment in the cloud computing environment; generate a corrective action for a first cybersecurity module of the plurality of cybersecurity modules, in response to determining that a phase of deployment for the first cybersecurity module indicates that the first cybersecurity module is partially deployed; and initiate the corrective action in the cloud computing environment.

Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: deploy a plurality of cybersecurity modules in a cloud computing environment, each cybersecurity module configured to monitor a portion of the cloud computing environment; periodically determine for each cybersecurity module a phase of deployment in the cloud computing environment; generate a corrective action for a first cybersecurity module of the plurality of cybersecurity modules, in response to determining that a phase of deployment for the first cybersecurity module indicates that the first cybersecurity module is partially deployed; and initiate the corrective action in the cloud computing environment.

Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
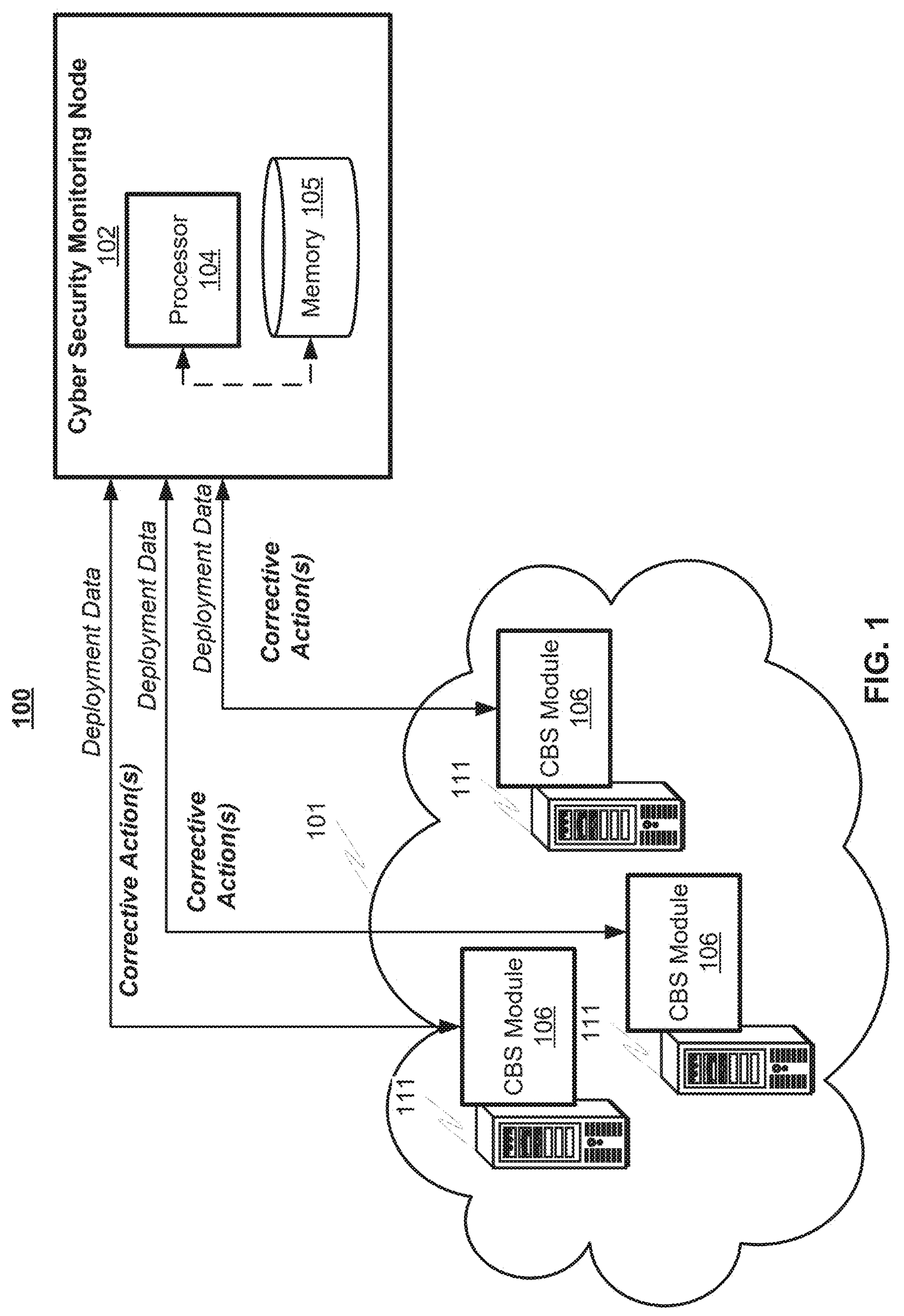
FIG. 1 is an example network diagram for monitoring cloud deployment of cybersecurity entities and generating a corrective action based on deployment of the cybersecurity modules in the cloud computing environments, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for monitoring cloud deployment of cybersecurity entities and generating a corrective action based on deployment of the cybersecurity modules in the cloud computing environments.

FIG. 1 is an example network diagram 100 for monitoring cloud deployment of cybersecurity entities and generating a corrective action based on deployment of the cybersecurity modules in the cloud computing environments, utilized to describe an embodiment.

Referring to FIG. 1, the example network 100 includes the Cyber Security Monitoring (CSM) node 102 connected to a cloud environment 101 over a network. The cloud environment 101 has cloud entities 111 that host cybersecurity modules 104 over network. In an embodiment, the network includes a wireless, cellular or wired network, a local area network (LAN), a wide area network (WAN), a metro area network (MAN), the Internet, the worldwide web (WWW), similar networks, and any combination thereof.

The CSM node 102 has a 104 processor and a memory 105. In some embodiments, the CSM node 102 is implemented as a virtual machine, a software container, a serverless function, a combination thereof, and the like.

The entities of the cloud environment 101 may be implemented, for example, as a VPC on a cloud computing infrastructure, such as Amazon® Web Services (AWS), Google® Cloud Platform (GCP), Microsoft® Azure, and the like.

In an embodiment, the cloud environment 101 may include cloud entities 111, such as resources and principals. A resource is a cloud entity that supplies functionality, such as processing power, memory, storage, communication, and the like. A resource may supply more than one functionality. Resources may include, for example, virtual machines (VMs), container engines, agentless entities (not shown), and the like.

In an embodiment, the cloud environment 101 may further include an application programming interface (API), through which actions in the cloud environment may be triggered. A container engine may be implemented using Kubernetes® or Docker®. A serverless function may be implemented using Lambda®. VMs may be implemented using Oracle® VirtualBox, Azure Virtual Machines, and the like. In certain embodiments, the container engine(s) may configure VMs to run a containerized application (also referred to as container). The container engine may be configured to access a repository, such as AWS Elastic Container Registry (ECS), from which an image is pulled and mounted at a mount point to generate live container(s).

A principal is a cloud entity that acts on a resource, meaning it can request, or otherwise initiate, actions or operations in the cloud environment that cause a resource to perform a function. A principal may be, for example, a user account, a service account, a role, and the like. In an embodiment, a principal is implemented as a data structure that includes information about an entity, such as a username, a password hash, an associated role, and the like. In an embodiment, a principal may include a privilege that allows the principal to configure the container engine to run a container.

The cloud environment 101 is connected with the monitoring environment implemented as the CSM node 102. The monitoring environment may be implemented as a cloud computing environment. In an embodiment, the CSM node 102 is deployed on a cloud computing infrastructure shared with the cloud environment 101. In certain embodiments, a portion of the monitoring environment may be deployed in the cloud environment 101. In some embodiments, certain workloads deployed in the monitoring environment may be deployed in the cloud environment 101. For example, the monitoring environment may access a principal, such as a service account, which allows the monitoring environment to initiate correction actions in the cloud environment 101.

The monitoring environment may include a plurality of monitor workloads. In an embodiment, the monitor workloads may be configured to inspect virtual instances, such as container or VM images, of the cloud environment 101 for deployment of the cybersecurity (CBS) modules 104.

In one embodiment, the CSM node 102 may deploy cybersecurity modules 104 in a cloud computing environment 101. As discussed above, each CBS module 106 may be configured to monitor a portion of the cloud computing environment 101 associated with the cloud entities 111. The CSM node 102 may periodically determining for each CBS module 106 a phase of deployment in the cloud computing environment 101. Then, the CSM node 102 may generate a corrective action for the CBS module 106, in response to determining that a phase of deployment for the particular CBS module 106 indicates that the CBS module 106 is partially deployed. Then, the CSM node 102 may initiate the corrective action in the cloud computing environment 101.

Figure 2:
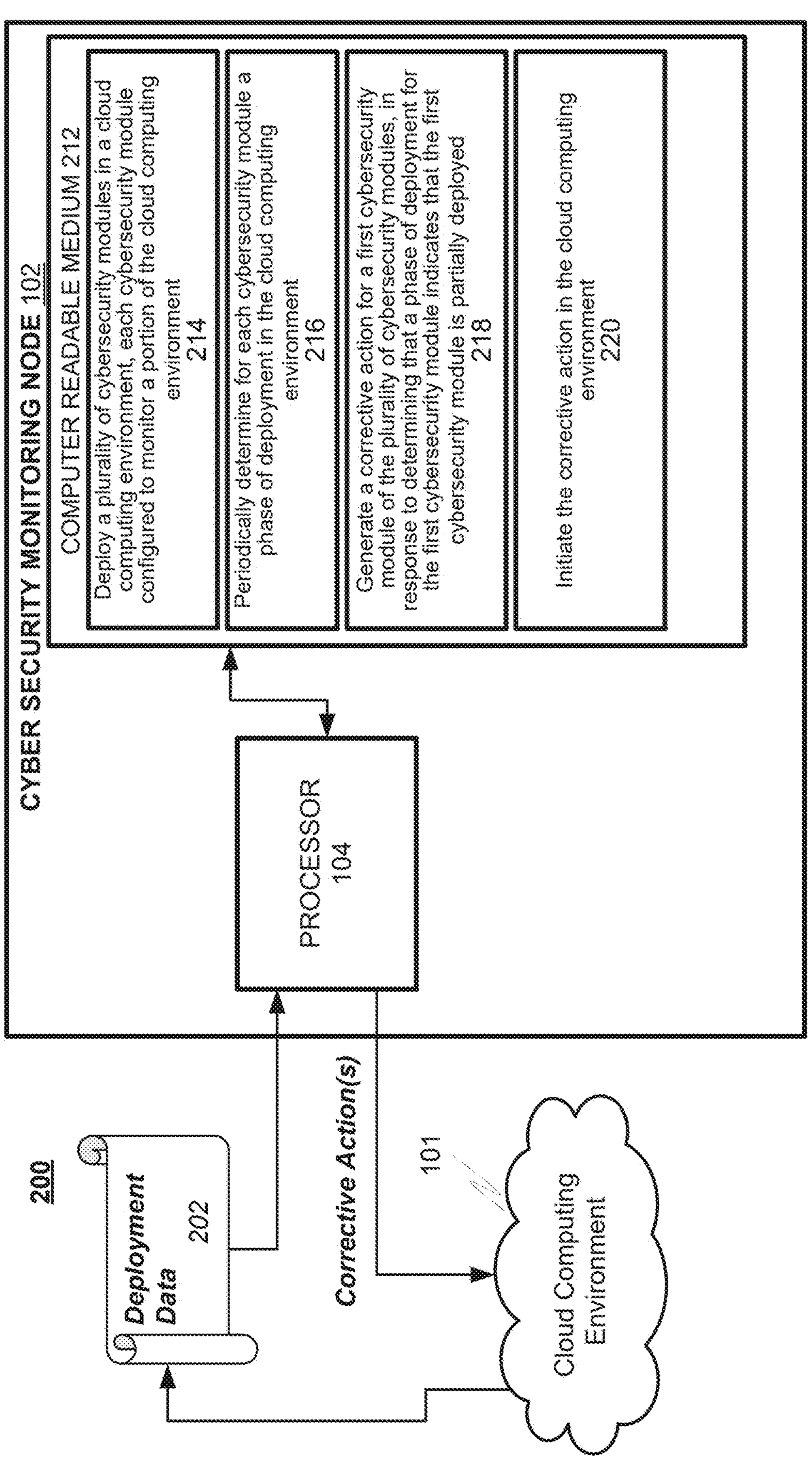
FIG. 2 is an example network diagram of a system for monitoring cloud deployment of cybersecurity entities and generating a corrective action based on deployment of the cybersecurity modules in the cloud computing environment including detailed features of a Cyber Security Monitoring (CSM) node consistent with the present disclosure.

FIG. 2 is an example network diagram of a system for monitoring cloud deployment of cybersecurity entities and generating a corrective action based on deployment of the cybersecurity modules in the cloud computing environment including detailed features of a Cyber Security Monitoring (CSM) node 102 consistent with the present disclosure.

As discussed above with respect to FIG. 1, the CSM node 102 may deploy cybersecurity modules (CBS) 106 in a cloud computing environment 101. Each CBS module 106 may be configured to monitor a portion of the cloud computing environment 101 associated with the cloud entities 111 for cyber threats. The CSM node 102 may acquire deployment data 202 from the cloud computing environment 101. Then, the CSM node 102 may generate a corrective action for the CBS modules 106 of the cloud computing environment 101, in response to determining based on the deployment data 202 that a phase of deployment for the particular CBS module 106 indicates that the CBS module 106 is partially deployed. Then, the CSM node 102 may initiate the corrective action in the cloud computing environment 101.

While this example describes in detail only one CSM node 102, multiple such nodes may be connected to the network and to the cloud computing environment 101. It should be understood that the CSM node 102 may include additional components and that some of the components described herein may be removed and/or modified without departing from a scope of the CSM node 102 disclosed herein. The CSM node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the CSM node 102 may include multiple processors, multiple cores, or the like, without departing from the scope of the CSM node 102 system.

The CSM node 102 may also include a non-transitory computer readable medium 212 that may have stored thereon machine-readable instructions executable by the processor 104. Examples of the machine-readable instructions are shown as 214-220 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 104 may fetch, decode, and execute the machine-readable instructions 214 to deploy a plurality of cybersecurity modules in a cloud computing environment 101, each cybersecurity module configured to monitor a portion of the cloud computing environment 101. The processor 104 may fetch, decode, and execute the machine-readable instructions 216 to periodically determine for each cybersecurity module a phase of deployment in the cloud computing environment. The processor 104 may fetch, decode, and execute the machine-readable instructions 218 to generate a corrective action for a first cybersecurity module of the plurality of cybersecurity modules, in response to determining that a phase of deployment for the first cybersecurity module indicates that the first cybersecurity module is partially deployed. The processor 104 may fetch, decode, and execute the machine-readable 220 to initiate the corrective action in the cloud computing environment 101.

Figure 3A:
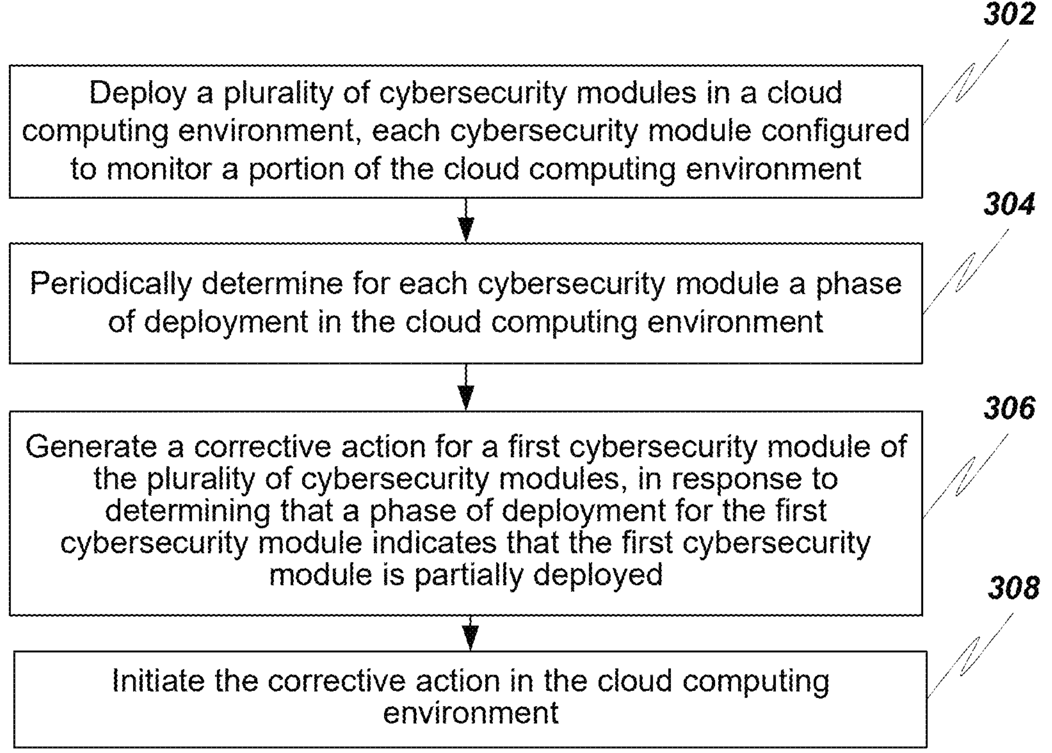
FIG. 3A is an example of a flowchart of a method for monitoring cloud deployment of cybersecurity entities and generating a corrective action based on deployment of the cybersecurity modules in the cloud computing environment, implemented in accordance with an embodiment.

FIG. 3A is an example of a flowchart of a method for monitoring cloud deployment of cybersecurity entities and generating a corrective action based on deployment of the cybersecurity modules in the cloud computing environment, implemented in accordance with an embodiment.

Referring to FIG. 3A, the method 300 may include one or more of the steps described below. FIG. 3A illustrates a flow chart of an example method executed by the CSM node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 104 of the CSM node 102 may execute some or all of the operations included in the method 300.

With reference to FIG. 3A, at block 302, the processor 104 may deploy a plurality of cybersecurity modules in a cloud computing environment, each cybersecurity module configured to monitor a portion of the cloud computing environment. At block 304, the processor 104 may periodically determine for each cybersecurity module a phase of deployment in the cloud computing environment. At block 306, the processor 104 may generate corrective action for a first cybersecurity module of the plurality of cybersecurity modules, in response to determining that a phase of deployment for the first cybersecurity module indicates that the first cybersecurity module is partially deployed. At block 308, the processor 104 may initiate the corrective action in the cloud computing environment.

Figure 3B:
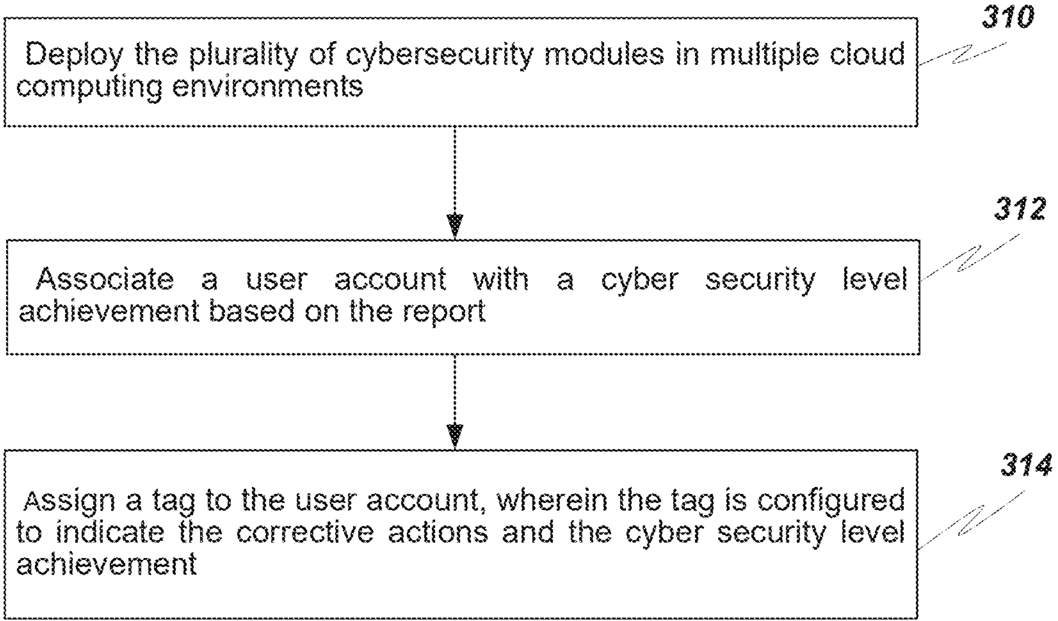
FIG. 3B is a further example flowchart of a method for monitoring cloud deployment of cybersecurity entities and generating a corrective action based on deployment of the cybersecurity modules in the cloud computing environment, implemented in accordance with an embodiment.

FIG. 3B is a further example flowchart of a method for monitoring cloud deployment of cybersecurity entities and generating a corrective action based on deployment of the cybersecurity modules in the cloud computing environment, implemented in accordance with an embodiment.

Referring to FIG. 3B, the method 300' may include one or more of the steps described below. FIG. 3B illustrates a flow chart of an example method executed by the CSM node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 104 of the CSM node 102 may execute some or all of the operations included in the method 300'.

With reference to FIG. 3B, at block 310, the processor 104 may deploy the plurality of cybersecurity modules in multiple cloud computing environments. In one embodiment, the multiple cloud computing environments are each deployed on a different cloud computing infrastructure including but not limited to VPC, AWS VPC and GPT infrastructures. The cybersecurity modules may be implemented as a combination of agents hosted on VMs (and other virtualizations) and agentless modules.

In one embodiment, the corrective action may be implemented as generating instructions to the deployed cybersecurity module of the plurality of cybersecurity modules to give access install or deploy additional monitors including VMs, containers and IAM servers. The corrective action may include generating a user interface configured to render a report indicating state of deployment of the cybersecurity modules to a monitoring platform administrator.

In one embodiment, the report may indicate deployment of AV, anti-malware, ransom ware protection and intrusion detection. The report may also indicate protection gaps based on the state of deployment of the cybersecurity modules.

At block 312, the processor 104 may associate a user account with a cybersecurity level achievement based on the report. At block 314, the processor 104 may assign a tag to the user account, wherein the tag is configured to indicate the corrective actions and the cybersecurity level achievement.

As another example, a representation of a deployment may be based on machine image, such as an Amazon® machine image (AMI) in an AWS cloud computing environment. In such an embodiment, each additional AMI deployed in the cloud computing environment may require a correction action based on monitoring.

Figure 4:
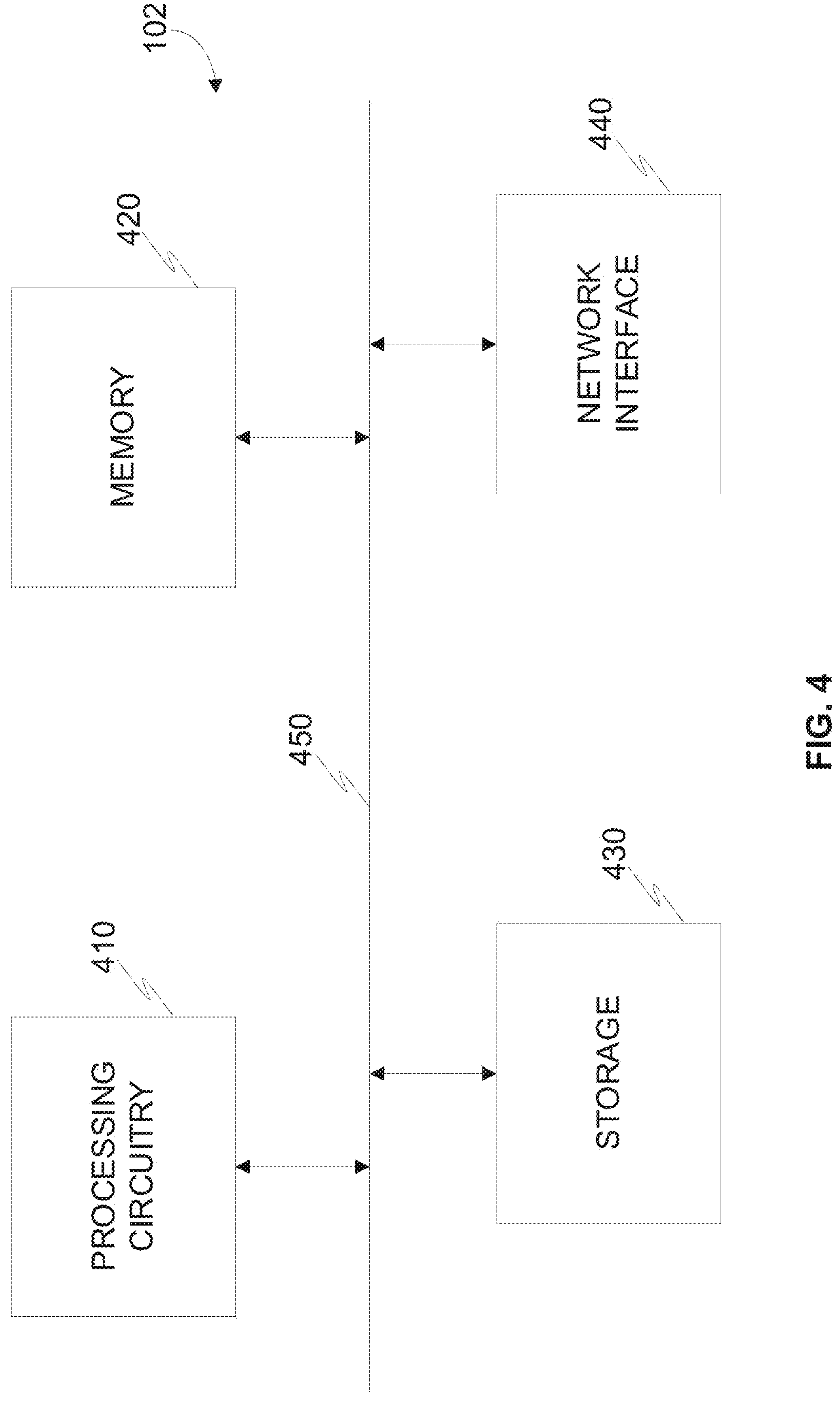
FIG. 4 is an example schematic diagram of a system including a computing device for performing the method of FIGS. 3A and 3B.

FIG. 4 is an example schematic diagram of a cybersecurity monitoring (CSM) node 102 according to an embodiment. The CSM node 102 includes, according to an embodiment, a processing circuitry 410 coupled to a memory 420, a storage 430, and a network interface 440. In an embodiment, the components of the CSM node 102 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the CSM node 102 with communication with the network, according to an embodiment.

It should be understood that the embodiments described herein are not limited to the specific architecture illustrated in FIG. 4, and other architectures may be equally used without departing from the scope of the disclosed embodiments.

Furthermore, in certain embodiments may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for deploying a cybersecurity monitoring system in a cloud computing environment, comprising:
   - deploying a plurality of cybersecurity modules in a cloud computing environment, each cybersecurity module configured to monitor a portion of the cloud computing environment,
   - periodically determining for each cybersecurity module a phase of deployment in the cloud computing environment;
   - generating a corrective action for a first cybersecurity module of the plurality of cybersecurity modules, in response to determining that a phase of deployment for the first cybersecurity module indicates that the first cybersecurity module is partially deployed;
   - rendering a report indicating state of deployment of the cybersecurity modules;
   - associating a user account with a cybersecurity level achievement based on the report;
   - assigning a tag to the user account, wherein the tag is configured to indicate the corrective actions and the cybersecurity level achievement; and
   - initiating the corrective action in the cloud computing environment.

2. The method of claim 1 further comprising deploying the plurality of cybersecurity modules in multiple cloud computing environments.

3. The method of claim 2, wherein the multiple cloud computing environments are each deployed on a different cloud computing infrastructure.

4. The method of claim 1, further comprising:
   - deploying a first plurality of cybersecurity modules as agents hosted on virtualizations in the cloud computing environment; and
   - deploying a second plurality of cybersecurity modules as agentless modules.

5. The method of claim 1, wherein the corrective action comprises:
   - generating instructions to a deployed cybersecurity module of the plurality of cybersecurity modules to deploy additional monitors.

6. The method of claim 1, wherein the corrective action comprises:
   - generating a user interface configured to render the report.

7. The method of claim 6, wherein the report indicates deployment of any of: AV, anti-malware, ransom ware protection and intrusion detection.

8. The method of claim 6, wherein the report indicates protection gaps based on the state of deployment of the cybersecurity modules.

9. A non-transitory computer-readable medium storing a set of instructions for deploying a cybersecurity monitoring system in a cloud computing environment, the set of instructions comprising:
   - one or more instructions that, when executed by one or more processing circuitry of a device, cause the device to:
     - deploy a plurality of cybersecurity modules in a cloud computing environment, each cybersecurity module configured to monitor a portion of the cloud computing environment;
     - periodically determine for each cybersecurity module a phase of deployment in the cloud computing environment;
     - generate a corrective action for a first cybersecurity module of the plurality of cybersecurity modules, in response to determining that a phase of deployment for the first cybersecurity module indicates that the first cybersecurity module is partially deployed;
     - render a report indicating state of deployment of the cybersecurity modules;
     - associate a user account with a cybersecurity level achievement based on the report;
     - assign a tag to the user account, wherein the tag is configured to indicate the corrective actions and the cybersecurity level achievement; and
     - initiate the corrective action in the cloud computing environment.

10. A system for deploying a cybersecurity monitoring system in a cloud computing environment comprising:
   - a processing circuitry;
   - a memory, the memory containing instructions that, when executed by the processing circuitry, configure the system to:
   - deploy a plurality of cybersecurity modules in a cloud computing environment, each cybersecurity module configured to monitor a portion of the cloud computing environment;
   - periodically determine for each cybersecurity module a phase of deployment in the cloud computing environment;
   - generate a corrective action for a first cybersecurity module of the plurality of cybersecurity modules, in response to determining that a phase of deployment for the first cybersecurity module indicates that the first cybersecurity module is partially deployed;
   - render a report indicating state of deployment of the cybersecurity modules;
   - associate a user account with a cybersecurity level achievement based on the report;
   - assign a tag to the user account, wherein the tag is configured to indicate the corrective actions and the cybersecurity level achievement; and
   - initiate the corrective action in the cloud computing environment.

11. The system of claim 10, wherein the memory contains further instructions which when executed by the processing circuitry further configure the system to:
   - deploy the plurality of cybersecurity modules in multiple cloud computing environments.

12. The system of claim 11, wherein the multiple cloud computing environments are each deployed on a different cloud computing infrastructure.

13. The system of claim 10, wherein the memory contains further instructions which when executed by the processing circuitry further configure the system to:
   - deploy a first plurality of cybersecurity modules as agents hosted on virtualizations in the cloud computing environment; and
   - deploy a second plurality of cybersecurity modules as agentless modules.

14. The system of claim 10, wherein the corrective action comprises:
   - generating instructions to the deployed cybersecurity module of the plurality of cybersecurity modules to deploy additional monitors.

15. The system of claim 10, wherein the corrective action comprises:

generating a user interface configured to render the report.

16. The system of claim 15, wherein the report indicates deployment of any of: AV, anti-malware, ransomware protection and intrusion detection.

17. The system of claim 15, wherein the report indicates protection gaps based on the state of deployment of the cybersecurity modules.

* * * * *